(12) United States Patent
Greenwood

(10) Patent No.: US 12,003,472 B1
(45) Date of Patent: Jun. 4, 2024

(54) METHODS, SYSTEMS AND COMPUTER READABLE MEDIA FOR COORDINATING PUBLISH-SUBSCRIBE MESSAGING

(71) Applicant: Precisely Software Incorporated, Burlington, MA (US)

(72) Inventor: John R. Greenwood, Reading (GB)

(73) Assignee: Precisely Software Incorporated, Burlington, MA (US)

( * ) Notice: Subject to any disclaimer, the term of this patent is extended or adjusted under 35 U.S.C. 154(b) by 0 days.

(21) Appl. No.: 18/157,209

(22) Filed: Jan. 20, 2023

(51) Int. Cl.
  *H04L 51/216* (2022.01)

(52) U.S. Cl.
  CPC .................. *H04L 51/216* (2022.05)

(58) Field of Classification Search
  CPC ..... H04L 51/216; H04L 41/02; H04L 51/234; H04L 67/10; H04L 43/08; G06F 9/542
  See application file for complete search history.

(56) References Cited

U.S. PATENT DOCUMENTS

| | | | |
|---|---|---|---|
| 11,178,091 B1* | 11/2021 | Madhavan | H04L 49/9036 |
| 2005/0096928 A1* | 5/2005 | Ruggaber | H04L 12/18 |
| | | | 709/220 |
| 2012/0272252 A1* | 10/2012 | Beardsmore | H04L 41/02 |
| | | | 719/328 |
| 2012/0303725 A1* | 11/2012 | Sato | H04L 51/214 |
| | | | 709/206 |
| 2019/0208032 A1* | 7/2019 | Sivasubramanian | ......... |
| | | | H04L 1/1614 |

* cited by examiner

*Primary Examiner* — Cheikh T Ndiaye
(74) *Attorney, Agent, or Firm* — KDW FIRM PLLC

(57) ABSTRACT

Methods, systems, and computer readable media for coordinating publish-subscribe messaging. The method includes receiving, from a publisher, a first message pertaining to a first topic and sending the first message to at least a subscriber subscribed to the first message. The method further includes receiving, from each of the at least a subscriber subscribed to the first message, an acknowledgment that an action related to the first message is complete. The method further includes notifying the publisher that all acknowledgments related to the first message are received when the broker receives the acknowledgment from each of the at least a subscriber subscribed to the first message. The method further includes receiving, from the publisher, a second message based on the notification that all acknowledgments for the first message are received.

17 Claims, 10 Drawing Sheets

METHODS, SYSTEMS AND COMPUTER READABLE MEDIA FOR COORDINATING PUBLISH-SUBSCRIBE MESSAGING

TECHNICAL FIELD

The subject matter described herein relates to publish-subscribe messaging. More particularly, the subject matter described herein relates to methods, systems, and computer readable media for coordinating publish-subscribe messaging.

BACKGROUND

A publish-subscribe pattern, also referred to herein as a publish-subscribe design or publish-subscribe messaging, is a type of object-oriented messaging pattern providing asynchronous communication between a publisher, which sends messages, and a subscriber, which receives the messages. In a publish-subscribe pattern, a publisher publishes a message to an intermediary known as a broker rather than directly to subscribers. The broker stores and forwards the message to only subscribers that have registered subscriptions to the type of message, such as a specific topic of the message, the publisher sent. With the broker as an intermediary, the publisher and the subscriber do not require information concerning the other to operate. Publishers and subscribers may be ignorant of system topology, which improves scalability.

A potential problem with the publish-subscribe design arises if actions that occur in response to messages need to be performed in a particular sequence. For example, issues occur if a subscriber should not start work on responding to a second message until all subscribers to a first message have completed their work responding to the first message. In a synchronous environment this is guaranteed, because a second message will not be published until all the methods calls pertaining to the publication of a first message have returned. In an asynchronous environment, where subscribers are separate and perform concurrent jobs, the publisher does not know when all actions that have been performed in response to a particular message have been completed.

SUMMARY

The subject matter described herein includes methods, systems, and computer readable media for coordinating publish-subscribe messaging. A method for coordinating publish-subscribe messaging includes a broker receiving, from a publisher, a first message pertaining to a first topic and sending the first message to at least a subscriber subscribed to the first message. The method further includes the broker receiving, from each of the at least a subscriber subscribed to the first message, an acknowledgment that an action related to the first message is complete. The method further includes the broker notifying the publisher that all acknowledgments related to the first message are received when the broker receives the acknowledgment from each of the at least a subscriber subscribed to the first message. The method further includes the broker receiving, from the publisher, a second message based on the notification that all acknowledgments for the first message are received.

A system for coordinating publish-subscribe messaging includes a processor, a memory communicatively connected to the processor, and broker implemented using the processor and the memory. The broker is configured for receiving, from a publisher, a first message pertaining to a first topic and sending the first message to at least a subscriber subscribed to the first message. The broker is further configured for receiving, from each of the at least a subscriber subscribed to the first message, an acknowledgment that an action related to the first message is complete. The broker is further configured for notifying the publisher that all acknowledgments related to the first message are received when the broker receives the acknowledgment from each of the at least a subscriber subscribed to the first message. The broker is further configured for receiving, from the publisher, a second message based on the notification that all acknowledgments for the first message are received.

The subject matter described herein may be implemented in or with software in combination with hardware and/or firmware. For example, the subject matter described herein may be implemented in or with software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application-specific integrated circuits. In addition, a computer readable medium that implements the subject matter described herein may be located on a single device or computing platform or may be distributed across multiple devices or computing platforms.

As used herein, each of the terms "component", "element", "source", "module", and "target" refers to hardware, firmware, or software in combination with hardware and/or firmware for implementing features described herein.

BRIEF DESCRIPTION OF THE DRAWINGS

Embodiments of the subject matter described herein will now be explained with reference to the accompanying drawings, wherein like reference numerals represent like parts, of which.

DETAILED DESCRIPTION

The subject matter described herein includes methods, systems, and computer readable media for coordinating publish-subscribe messaging. Observer pattern is a widely used industry standard object-oriented design pattern and is documented in "Design Patterns Elements of Reusable Object-Oriented Software" by the "Gang of Four", Gamma, Helm, Johnson and Vlissides. A common variant is a publish-subscribe pattern, also known as publish-subscribe messaging, which introduces a broker to mediate messages between a publisher and a subscriber. The presently disclosed subject matter may be written in object-oriented programming language including, without limitation, Java, Python, C#, GoLang, and the like.

Figure 1A:
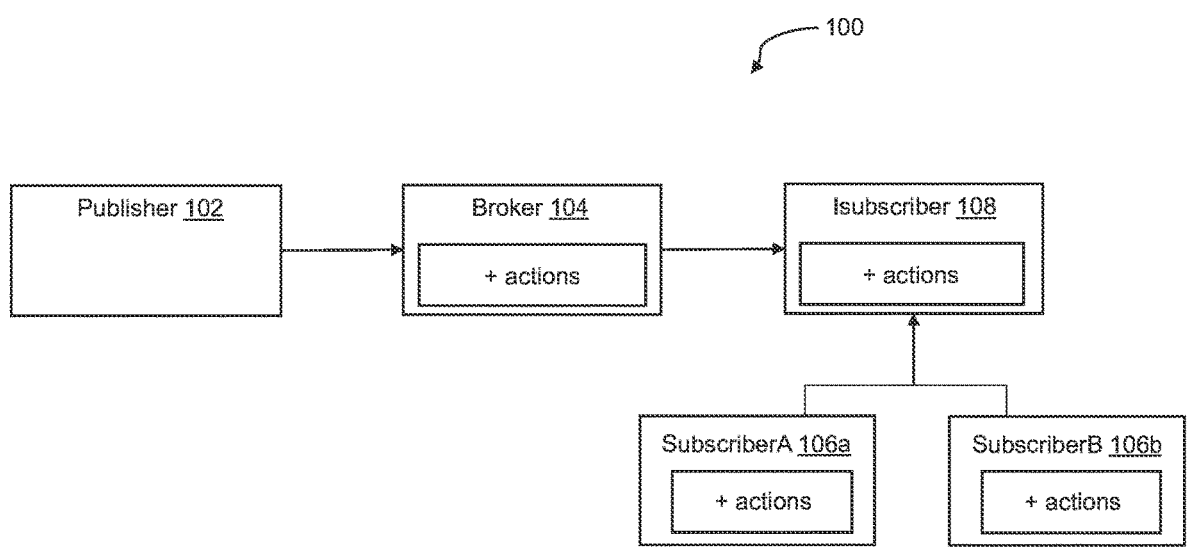
FIG. 1A is a unified modeling language (UML) class diagram illustrating an implementation of example messages transmitted in a publish-subscribe messaging pattern.

FIG. 1A is a unified modeling language (UML) class diagram illustrating an implementation of example messages transmitted in a publish-subscribe messaging pattern 100. A publish-subscribe message pattern uses a decoupled architecture wherein components are able to communicate while remaining decoupled, allowing each component to perform its tasks independently of the others while also enabling structural variations between data source and data target. This decoupled architecture allows new subscribers to more easily be added to the communication system that can act on a publisher's messages without needing to make alterations to the code of the publishers. This means that the design pattern enables the code to adhere to the second of the SOLID principles for Object-Oriented designs—the Open-Closed Principle (OCP)—which states that "A Module should be open for extension but closed for modification." One advantage of the OCP is that the system can be extended without changing preexisting code, which minimizes the probability of breaking the code and enhances the code's maintainability. Also, if the number of features and the quantity of code is expected to grow, then decoupling prevents the system from growing unmanageably complex, while still allowing components to communicate.

FIG. 1A is a UML class diagram that shows an implementation of example messages transmitted in publish-subscribe messaging pattern 100 in which a publisher 102 is configured to send messages to a broker 104 for publication. A message may include a command for one or more subscribers 106 to perform one or more actions. Broker 104 receives the message from publisher 102 and forwards it to subscribers 106 that are subscribed to receive that type of message, such as SubscriberA 106a and SubscriberB 106b. In some embodiments, publisher 102 may be configured to send messages to a plurality of brokers 104. For example, publisher 102 may send a first class of message types to a first broker 104 and a second class of message types to a second broker 104.

In some embodiments, publish-subscribe messaging pattern 100 may implement data abstraction to hide certain information and only show necessary information. As an example abstraction, FIG. 1A shows Isubscriber 108, which is an object-oriented interface. Isubscriber 108 may be configured to process actions, such as receive a notification of a message, such as notify(message:Message), from publisher 102. Subscribers 106 may be configured to process actions, such as receive a notification of the message from Isubscriber 108.

Figure 1B:
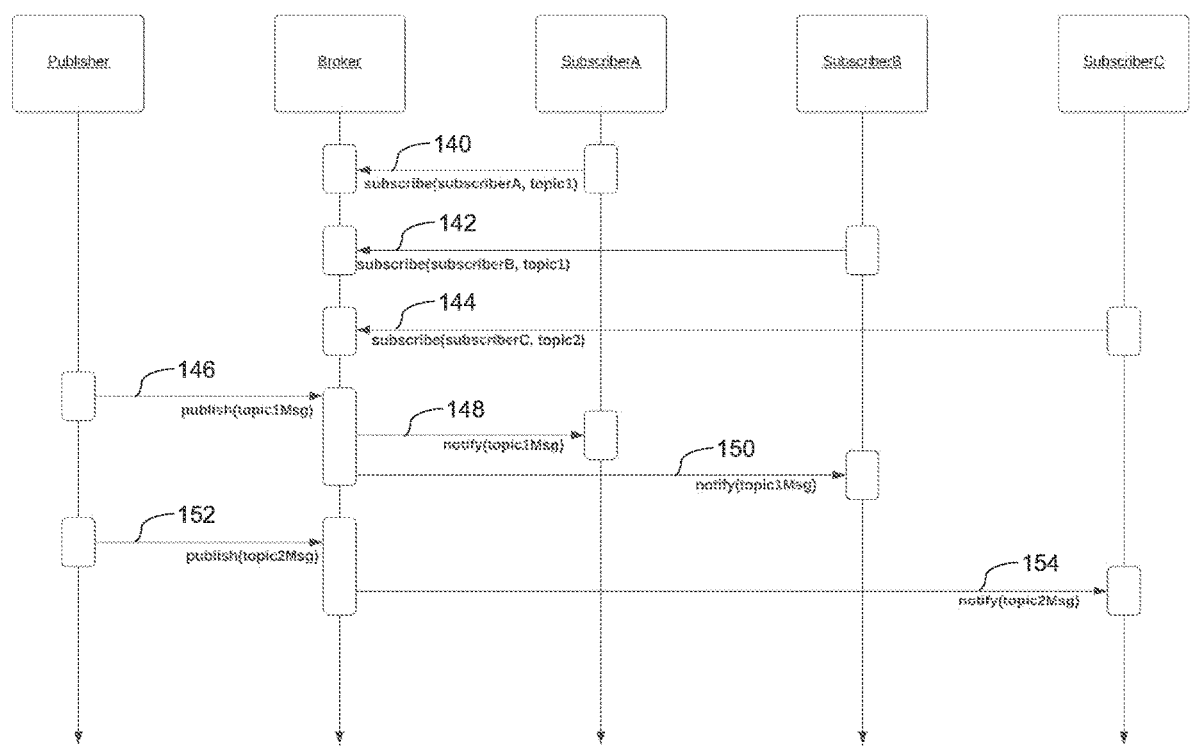
FIG. 1B is a message flow diagram illustrating example messages exchanged in subscribing subscribers to message types and publishing messages.

FIG. 1B is a message flow diagram illustrating example messages exchanged in subscribing subscribers to message types and publishing messages. As shown in FIG. 1B, both publisher 102 and subscribers 106 have access to broker 104 while remaining decoupled from one another. Subscribers 106 may elect to subscribe to a particular type of messages, such as messages pertaining to a specified topic. An object with access to broker 104, such as publisher 102, may elect to publish a message. FIG. 1B shows, for example, SubscriberA 106a and SubscriberB 106b each send a subscribe message 140, 142, respectively, to broker 104 to subscribe to message type topic1, requesting to be notified of any messages pertaining to topic1. Similarly, SubscriberC 106c sends a subscribe message 144 to broker 104 to subscribe to message type topic2, requesting to be notified of any messages pertaining to topic2. Publisher 102 publishes a topic1Msg 146, which is a message of topic1, to broker 104. Broker 104 then notifies SubscriberA 106a and SubscriberB 106b each with a notify message of topic1Msg 148 and a notify message topic1Msg 150, respectively, based on their subscription to messages of topic1. Publisher 102 then publishes a topic2Msg 152, which is a message of topic2. Broker 104 receives topic2Msg 152 and sends SubscriberC 106c a notify message of topic2Msg 154 based on the subscription by SubscriberC 106c to messages of topic2. Broker 104 may notify subscribers 106 of published messages based on their respective subscriptions by forwarding the corresponding published messages. For example, notify message of topic1Msg 148, notify message topic1Msg 150, and notify message of topic2Msg 154 may be the underlying message, namely topic1Msg and topic2Msg, forwarded by broker 104.

A potential problem with the publish-subscribe design arises if the actions that occur in response to a particular type of topic need to be performed in a particular sequence, for example if SubscriberC 106c should not start work on responding to topic2Msg until both SubscriberA 106a and SubscriberB 106b have completed their work responding to topic1Msg. In a synchronous environment this is guaranteed, because topic2Msg will not be published until all the methods calls pertaining to the publication of topic1Msg have returned. In an asynchronous environment, where SubscriberA 106a, SubscriberB 106b, and SubscriberC 106c are separate and concurrent jobs, publisher 102 does not know when all actions that have been performed in response to a particular message have been completed.

A new object-oriented design pattern, publish-subscribe-cascade, is described herein, which solves the problem of decoupled concurrent components needing to perform actions in response to messages in a prescribed order. The publish-subscribe-cascade pattern is a coordinated publish-subscribe pattern that allows for the coordination of a set of actions between different components with concurrent execution.

The main feature of the publish-subscribe-cascade pattern is an intelligent broker that can receive acknowledgements from subscribers 106 once the subscribers 106 complete the work that they must perform in response to a specific message. Broker 104 may maintain a record of which among the subscribers 106 notified of a specific message have acknowledged the message. Once all subscribers 106 that were notified of the message completed their work and have notified broker 104, then the broker 104 will notify publisher 102 that all work related to the message has completed. After receiving the confirmation that all work related to the first message has completed, publisher 102 can then publish the second message. The same process can then be repeated for a third message, a fourth message, or as many messages as needed. It is this process of waiting until all work in response to a message has been completed until publication of the next message that forms the cascade.

Figure 2:
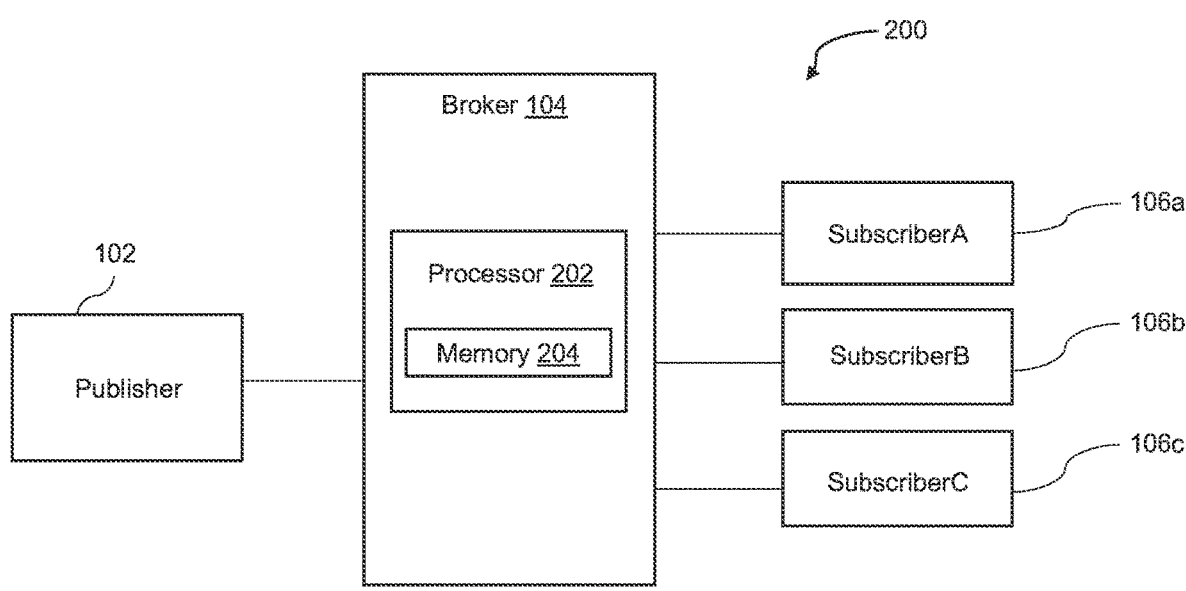
FIG. 2 is a block diagram of an example system for coordinating publish-subscribe messaging according to an embodiment of the presently disclosed subject matter.

FIG. 2 shows a block diagram of an example system for coordinating publish-subscribe messaging, generally designated 200. As shown in FIG. 2, broker 104 may include one or more processors 202, such as a central processing unit (e.g., a single core or multiple processing cores), a microprocessor, a microcontroller, a network processor, an application-specific integrated circuit (ASIC), or the like. Broker 104 may also include memory 204. Memory 204 may comprise random access memory (RAM), flash memory, a magnetic disk storage drive, and the like. In some embodiments, broker 104 may be communicatively connected to one or more databases to store and readily retrieve information, such as the location and features of publisher 102 and subscribers 106, published messages received from the publisher 102, and/or subscriptions received from the subscribers 106.

Broker 104 is communicatively connected to at least a publisher 102 and one or more subscribers 106, such as SubscriberA 106a, SubscriberB 106b, and SubscriberC 106c. Broker 104 may interface or communicate with one or more additional devices, such as publisher 102 and subscriber 106, as described below in further detail via a network interface device. Network interface device may be utilized for connecting broker 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Broker 104 may include but is not limited to, for example, a computing device or cluster of computing devices in a first location and a second computing device or cluster of computing devices in a second location. Broker 104 may include one or more computing devices dedicated to data storage, security, distribution of traffic for load balancing, and the like. Broker 104 may distribute one or more computing tasks as described below across a plurality of computing devices of computing device, which may operate in parallel, in series, redundantly, or in any other manner used for distribution of tasks or memory between computing devices.

Broker 104 is configured to receive subscribe and unsubscribe requests from subscribers 106, each identifying one or more message types. In some embodiments, broker 104 may send confirmation to the corresponding subscribers 106 of the subscribe and unsubscribe requests received once the registration or deregistration is complete. Broker 104 is configured to receive from a publisher a message. The message may include a message type, such as a topic. Broker 104 may store the message in memory 204 and send the message to subscribers 106 that have registered a subscription with broker 104 for the message type that matches the published message.

Figure 3A:
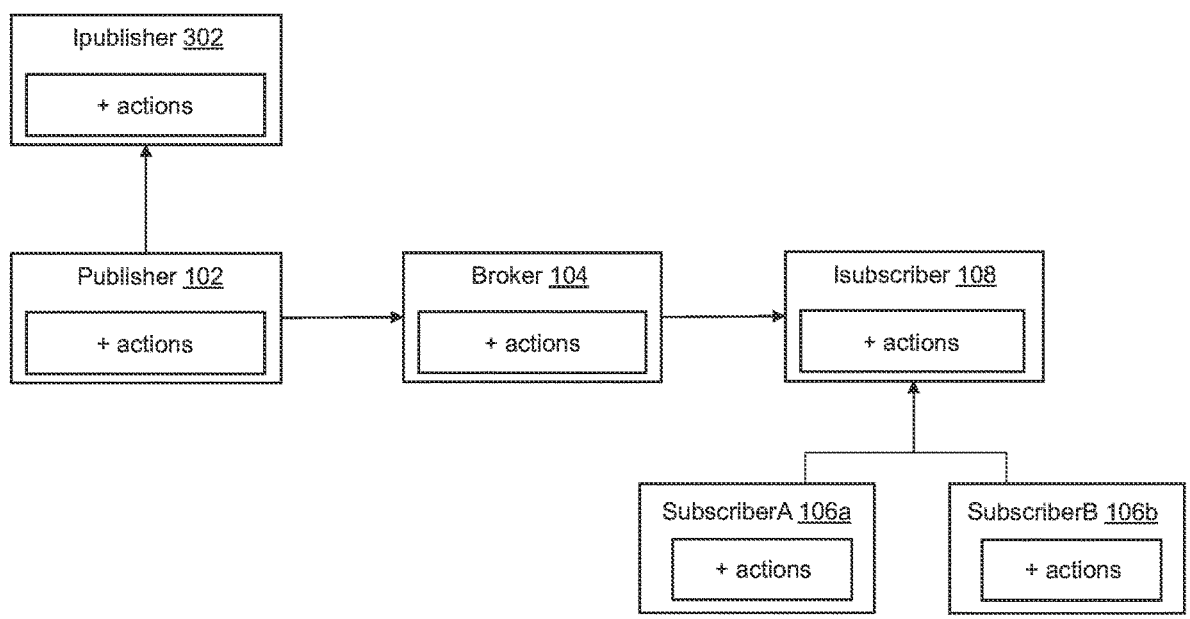
FIG. 3A is a UML class diagram illustrating an implementation of example messages transmitted in a coordinating publish-subscribe pattern according to an embodiment of the presently disclosed subject matter.
Figure 3B:
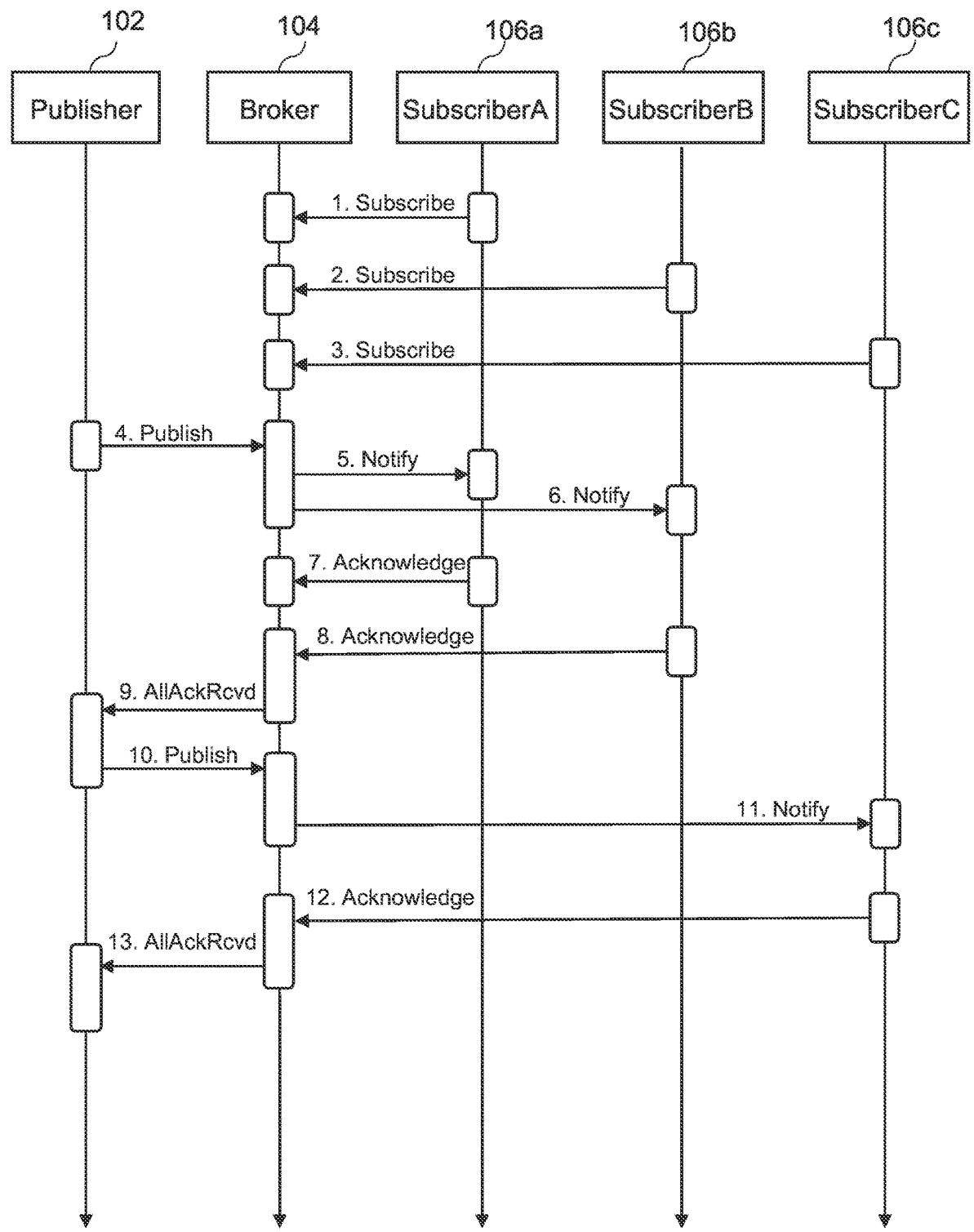
FIG. 3B is a message flow diagram illustrating example messages exchanged in a coordinated publish-subscribe messaging pattern according to an embodiment of the presently disclosed subject matter.

As shown in FIGS. 3A and 3B, subscribers 106 are each configured to send an acknowledgment to broker 104 that an action related to the message is complete after completing any and all actions or work related to the message. Subscribers 106 may not have any further action to complete related to the message if the related action was already completed before subscribers 106 receive the message or the related action is otherwise moot. In situations where subscribers 106 may not have any further action to complete related to a message when the subscribers 106 receive the message, the action related to the message is considered to already be complete and so the subscribers 106 send the acknowledgment. Broker 104 is configured to send publisher 102 confirmation of receipt of all acknowledgments once the broker 104 has received an acknowledgment from all subscribers 106 that are subscribed to the message. Broker 104 may store a record identifying which subscribers 106 sent acknowledgments and which subscribers 106 that are subscribed to the message have not sent acknowledgments. After publisher 102 is notified by broker 104 that all acknowledgments have been received for the message, the publisher 102 may publish a subsequent message to the broker 104. This process may continue, without limitation to the quantity of messages, until publisher 102 has published all messages.

In some embodiments, subscription may be content-based, wherein a subscription from subscribers 106 identifies a content and broker 104 forwards published messages from publisher 102 based on the content of the message in addition to or instead of the topic of the message. Broker 104 may be configured to determine a content of the message.

FIG. 3A is a UML class diagram illustrating an implementation of example messages transmitted in system 200. Similar to system 100 shown in FIG. 1A, FIG. 3A shows publisher 102 sends a message to broker 104 for publication and broker 104 forwards the message, optionally via interface ISubscriber 108, to SubscriberA 106a and SubscriberB 106b that are subscribed to receive that type of message. Unlike system 100, actions that broker 104 is configured to perform additionally include subscribe or unsubscribe subscribers 106 to a message type upon a request from the subscribers 106, such as subscribe(subscribe:ISubscriber, messageType MessageType) and unsubscribe(subscribe: ISubscriber, messageType MessageType), respectively, and receive acknowledgment notices from subscribers 106, such as acknowledge(message:Message). Additionally, publisher 102 may be configured to process actions such as receiving a notification from broker 104 confirming that the broker 104 has received acknowledgment from all subscribers 106 subscribed to the message that actions related to the message are complete. The confirmation may include, for example, ConfirmAllAcknowledgmentsReceived(message:Message).

In some embodiments, system 200 may include an abstraction, such as an object-oriented interface Ipublisher 302, configured to process actions. Actions may include receiving a notice from publisher 102 confirming that broker 104 received acknowledgment from all subscribed subscribers 106 that all actions pertaining to the message have been completed. The confirmation notice may be the same confirmation received by publisher 102 from broker 104.

FIG. 3B is a message flow diagram illustrating example messages exchanged in a coordinated publish-subscribe messaging pattern. Lines 1-6 and 10-11 are similar to messages in the message flow diagram of a publish-subscribe pattern shown in FIG. 1B, but FIG. 3B additionally shows coordination of the messages with acknowledgment messaging in lines 7-9 and 12-13. In line 1 of FIG. 3B, SubscriberA 106a sends a subscribe message to broker 104 to subscribe to message type topic1. In line 2, SubscriberB 106b also sends a subscribe message to broker 104 to subscribe to message type topic1. In line 3, SubscriberC 106c sends a subscribe message to broker 104 to subscribe to message type topic2. In line 4, publisher 102 publishes a topic1Msg to broker 104. In line 5, broker 104 notifies SubscriberA 106a with a notify message of topic1Msg. In line 6, broker 104 notifies SubscriberB 106b with a notify message of topic1Msg. Unlike in FIG. 1B, in lines 7 and 8, SubscriberA 106a and SubscriberB 106b, respectively, each send an acknowledgment, such as acknowledge(topic1Msg), to broker 104 after completing any and all actions pertaining to the message topic1Msg. Because SubscriberA 106a and SubscriberA 106b are all the subscribers to topic1Msg, broker 104 then confirmation that all acknowledgments have been received, such as allAcksRecevied(topic1Msg), to publisher 102 in line 9 to notify the publisher 102 that all the actions corresponding to the message topic1Msg is complete. Similar to the message flow shown in FIG. 1B, broker 104 may notify subscribers 106 of published messages based on their respective subscriptions by forwarding the corresponding published messages. For example, broker 104 notifying SubscriberA 106a of topic1Msg in line 5, broker 104 notifying SubscriberB 106b of topic1Msg in line 6, and broker 104 notifying SubscriberC 106c of topic2Msg in line 11 may be the underlying message, namely topic1Msg and topic2Msg, forwarded by broker 104 to the respective subscribers 106.

After publisher 102 receives confirmation that all acknowledgments have been received by broker 104, publisher 102 then publishes a second message in line 10, such as topic2Msg. In line 11, broker 104 sends SubscriberC 106c notification message of topic2Msg based on the subscription by SubscriberC 106c to messages of topic2. In line 12, SubscriberC 106c sends an acknowledgment message, such as acknowledge(topic2Msg), to broker 104 after completing any and all actions pertaining to the message topic2Msg. Because SubscriberC 106c is the only subscriber to the topic2Msg, broker 104 sends to publisher 102 an all acknowledgments received message, such as allAcksRecevied(topic2Msg), in line 13 to notify the publisher 102 that all the actions corresponding to the message topic2Msg is complete. Publisher 102 may then publish a subsequent message and the process may continue until the publisher 102 has published all messages.

When subscribers 106 go offline, such as teardown a TCP communication session with broker 104, the subscribers 106 can no longer acknowledge messages to which they are subscribed. In some embodiments of the coordinated publish-subscribe messaging pattern, to prevent subscribers 106 that are offline from terminating a thread and halt publication of subsequent messages by not sending acknowledgments to broker 104, system 200 may require subscribers 106 to unsubscribe to any existing subscriptions prior to going offline. Thus, broker 104 will not send messages to subscribers 106 that are offline and the broker 104 will not wait to receive acknowledgments from the subscribers 106 that are offline. In some embodiments, broker 104 may ensure that it receives unsubscribe requests from subscribers 106 going offline for any current subscriptions of the subscribers 106.

Figure 4:
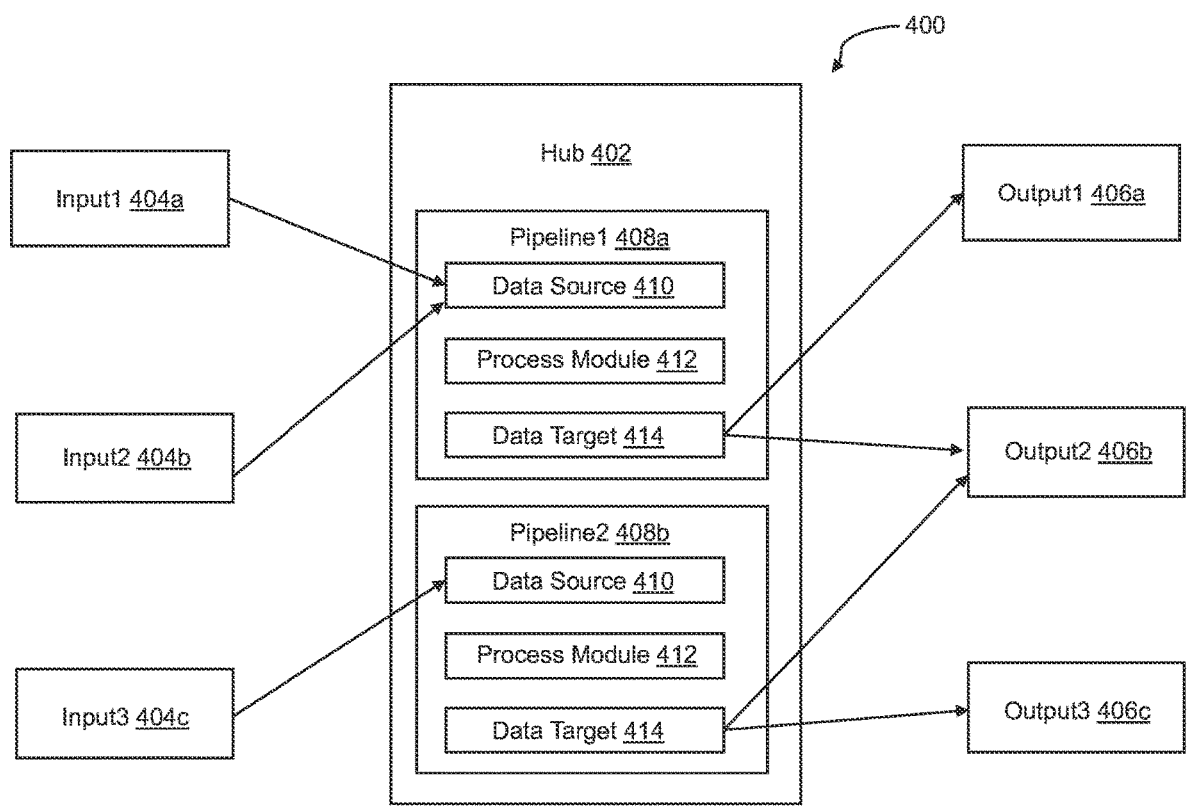
FIG. 4 is a block diagram illustrating an example middleware system according to an embodiment of the presently disclosed subject matter.

The described publish-subscribe-cascade pattern in system 200 has many possible applications, including for middleware that communicates between different software applications. FIG. 4 is a block diagram illustrating an example middleware system 400 that may implement system 200. In some embodiments, system 400 may include the IRONSTREAM® Hub software program. System 400 includes a hub 402 configured to receive data from one or more inputs 404 such as input1 404a, input2 404b, and/or input3 404c, process the data, and send the processed data to one or more outputs 406 such as output1 406a, output2 406b, and/or output3 406c. Hub may include a processor and/or a memory. In some embodiments, hub 402 may share a processor and/or memory with broker 104, such as processor 202 and/or memory 204 shown in FIG. 2. Hub 402 may include at least a pipeline 408, such as pipeline1 408a and pipeline2 408b. Pipeline 408 may include elements, namely one or more data sources 410, process modules 412, and/or data targets 414. Data from inputs 404 enter pipeline 408 via data sources 410. Data may come from a single one of inputs 404, such as input3 404c providing data to pipeline2 408b or data may come from multiple of inputs 404, such as input1 404a and input2 404b providing data to pipeline1 408a. One or more process modules 412 may process the data in pipeline 408, then the data exits pipeline 408 at one or more data targets 414 to one or more of outputs 406. Hub 402 may transmit data in pipeline 408 through multiple routes from data sources 410 to data targets 414. Pipeline 408 may include different types of data sources 410 and data targets 414 to handle different data transport mechanisms, for example HTTP or writing to a file.

In some embodiments, data sources 410 may include at least a Transmission Control Protocol/Internet Protocol (TCP/IP) server and/or TCP/IP client. A TCP server source of data sources 410 may receive data from an agent of system 400 running on a mainframe computer. A TCP client source of data sources 410 may be configured to request data from an agent of system 400 running on a personal computer. In some embodiments, data sources 410 may receive data imported manually by a user.

Process modules 412 may be configured to perform any number of processes on data in pipeline 408 for example, without limitation, a simple filter to sort data such as a set of records based on specified conditions, a regular expression filter transform to filter messages in a data stream according to a regular expression pattern, a JavaScript Object Notation (JSON) path filter for selecting and extracting a sub-section from a JSON document, a dependency injector such as a property injector to provide dependent objects outside of a class to the class, a JSON threshold alerter to trigger an alert when Java application instances exceed a set threshold, and/or a property concatenator to combine multiple properties into one property.

Figure 5A:
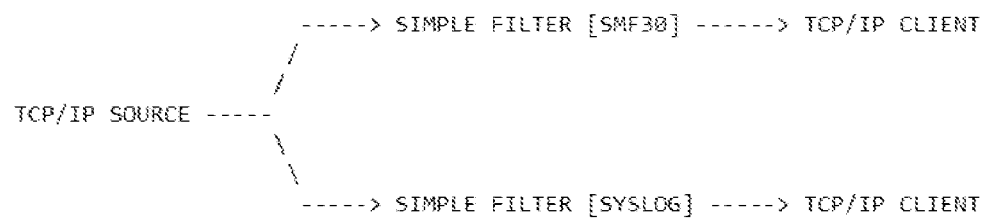
FIGS. 5A, 5B and 5C are flow diagrams illustrating example processes in a pipeline according to embodiments of the presently disclosed subject matter.
Figure 5B:
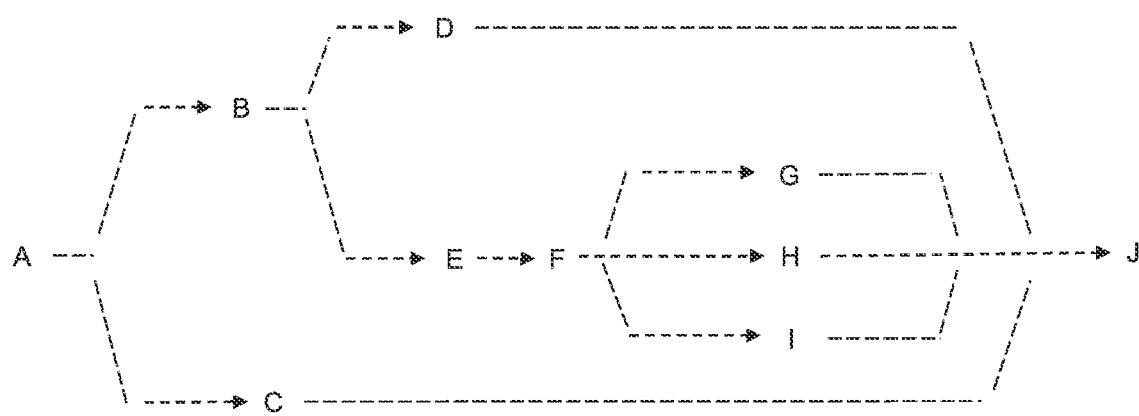
Figure 5C:
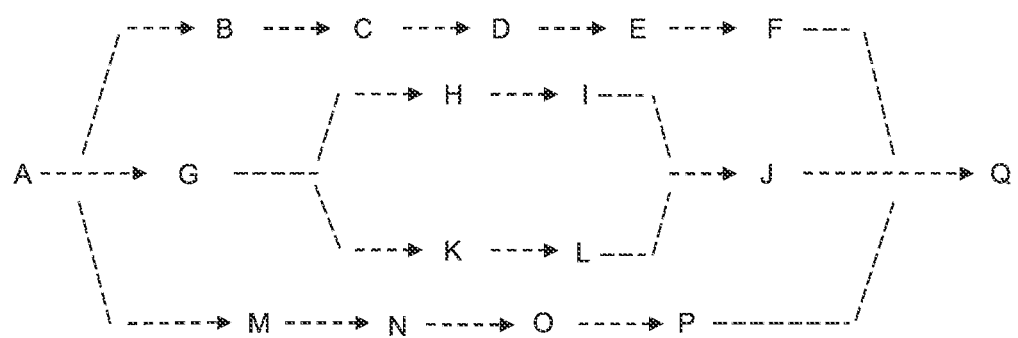

FIGS. 5A-5C show flow diagrams illustrating example processes in pipeline 408. All steps in pipeline 408 between data sources 410 and data targets 414 are processes performed by at least one of process modules 412. In some embodiments, different processes may be performed by separate ones of process modules 412. Data sources 410, process modules 412, and/or data targets 414 may be configured to perform actions concurrently within a same pipeline 408. In FIG. 5A, a TCP/IP source of data sources 410 receives data and forwards the data to a first data filter to filter System Management Facilities (SMF) record type 30 data, which is job performance data. The TCP/IP source of data sources 410 also forwards the data to a second filter to filter System Logging Protocol (Syslog) data, which is log data. The data processed by the first filter is then sent to a first TCP/IP client, which is acting as a first of data targets 414, and the data processed by the second filter is sent to a second TCP/IP client, which is acting as a second of data targets 414.

Now referring to FIG. 5B, at step A, the TCP/IP client configuration source of data sources 410 receives data and forwards the data to both a first filter that filters data with source type "journal" at step B and to a second filter that filters data with source type that are not "journal" at step C. The data processed from the second filter is then sent a file at step J, which is acting as one of data targets 414. The data processed from the first filter is sent to a third filter that filters data with object member "Q" at step D, which is then sent to the file acting as one of data targets 414 at step J. Data processed from the first filter at step B is also sent to a fourth filter that filters data with object member "RCCDSP" at step E, which is then sent to a fifth filter that filters data with K0V6C2 that is not "XCH" at step F. From step F, the data is sent to each of three additional filters that filters data with K07C2 "B1" at step G, data with KOV7C2 "B2" at step H, and K0V7C2 "B3" at step I. The processed data from steps G, H, and I is then sent to the file acting as one of data targets 414 at step J.

Now referring to FIG. 5C, at step A, a TCP/IP client source of data sources 410 receives data and forwards the data to a first filter at step B, a second filter at step G, and third filter at step M. The first filter at step B filters Message Queuing (MSMQ) data, which is sent to a regular expression filter that filters data based on message identity field at step C. At step D, a property concatenator then creates a custom string by combining job_name and job_id properties. From step D, a property injector adds the property "critical" to the class "status" at step E. The data is then processed by a JSON wrapper that wraps the data with application key sequence at step F, and then the data proceeds to an HTTP client target of data targets 414 at step Q. The second filter at step G filters performance counters for Linux in the data, and the data then is sent to both a threshold alert at step H that triggers when the average percent of CPU used is greater than 80% and a threshold alert at step K that triggers when the maximum jobs in the system exceeds 30. From step H, a property injector adds the property "critical" to the class "status" at step I, which is then sent to a JSON wrapper at step J that wraps the data with application key sequence, and then the data proceeds to the HTTP client target of data targets 414 at step Q. From step K, a property injector adds the property "warning" to the class "status" at step L, which is then sent to a JSON wrapper at step J that wraps the data with application key sequence, and then the data proceeds to the HTTP client target of data targets 414 at step Q. At step M, perf2 data is filtered, a threshold alert is applied at step N to trigger when the percent of auxiliary storage pools (ASP) use exceeds 80 percent. Then data is sent to a property injector at step 0 that adds the property "warning" to the class "status". The data is then sent to a JSON wrapper at step P that wraps the data with application key sequence and sends the data to the HTTP client target of data targets 414 at step Q.

Regardless of the particular process that is implemented in pipeline 408, the pipeline model is extremely flexible, as the only hard rule is that each route must start with at least one of data sources 410 and end in at least one of data targets 414. To allow the pipeline elements to be arranged in any arbitrary order, the elements must be decoupled from each other. In this way, an individual pipeline element has no knowledge about the types of the elements to which it is sending its data. Decoupling these elements introduces the problem of how to communicate with them when shutting the system down, and it is for this purpose that publish-subscribe-cascade can improve system 400. When Shutting down system 400 must be accomplished in a graceful manner to ensure that no data is lost. Any data that has already entered system 400, specifically pipeline 408, should be processed and sent out to data targets 414 before shutdown occurs. This design principle of system 400 is known as the "Strict Buffet Rule"—i.e. all food that is placed onto a plate must be eaten before leaving the restaurant.

A graceful shutdown of system 400 that will prevent a loss of data may be accomplished by performing the following in the stated order:

1. Stop data sources 410 from collecting data. Once this action is complete all data sources 410 will have passed all of their data to at least one of process modules 412. The data source jobs will have completed. No data will be able to enter pipeline 408.
2. Wait for all process modules 412 to finish processing data. Once this action is complete, all process modules 412 will have passed all their data onto data targets 414 further down pipeline 408. All process modules 412 jobs will have completed.
3. Wait for all data targets 414 to finish sending all data. Once this action is complete, all data targets 414 will have sent all their data. All data targets 414 jobs will have completed.
4. Reclaim unmanaged resources such as file handles and network connections that are used by data targets 414. Because some of these unmanaged resources may be shared between the different data targets 414, completion of the previous action is required before this action can begin.
5. End the program.

System 400 may implement a coordinated publish-subscriber pattern to execute the shutdown steps, such as the publish-subscribe-cascade pattern of system 200. Data sources 410 may subscribe to the StopSourcingData message, process modules 412 may subscribe to the FinishProcessing message, data targets 414 may subscribe to the FinishSendingData message, and shared resources such as the HTTP Connection Pool may subscribe to the Reclaim Resources message. Hub 402 may be publisher 102 in the publish-subscribe-cascade design. When system 400 is shutting down, the StopSourcingData message may be published by hub 402, which is acting as publisher 102. In response to the StopSourcingData message, all data sources 410, which may include TCP/IP servers sources and TCP/IP clients sources, stop collecting data and finish sending the data to at least one of process modules 412, each of data sources 410 acknowledging the message once each of data sources 410 has completed this action.

Once all subscribed data sources 410 have acknowledged the StopSourcingData message, broker 104 may inform hub 402 that all acknowledgements for the StopSourcingData message have been received. In response to the acknowledgments, hub 402 then publishes the FinishProcessing message. In response to the FinishProcessing message, all process modules 412 finish processing their data and each of process modules 412 sends their data to data targets 414, acknowledging the message once each of process modules 412 has completed this action. Once all subscribed process modules 412 have acknowledged the FinishProcessing message, broker 104 informs hub 402 that all acknowledgements for the FinishProcessing message have been received. In response to the acknowledgments, hub 402 then publishes the FinishSendingData message. In response to the FinishSendingData message, all data targets 414 finish sending their data, acknowledging the message once the data targets 414 have completed this action. File data targets 414 then close the file handles for which they are responsible. Once data targets 414, which may include file targets and HTTP client targets, have acknowledged the FinishSendingData message, broker 104 informs hub 402 that all acknowledgements for the FinishSendingData message have been received. In response to the acknowledgments, hub 402 may then then publish the Reclaim Resources message. At least a shared resource manager may be subscribed to and receive from hub 402 the Reclaim Resources message. In response to the ReclaimResources message, the shared resource manager, for example an HTTP connection pool configured for managing and reusing HTTP connections, closes all open connections and then acknowledges the message. Broker 104 then informs hub 402 that all acknowledgements for the Reclaim Resources message have been received. Hub 402 may then end the program.

In some embodiments, hub 402 includes a main control routine, which may act as publisher 102 and publish the messages described herein and receive confirmation from broker 104 that all acknowledgments have been received for the corresponding messages. In some embodiments, the shutdown process for hub 402 may be applied to an individual pipeline 408 or multiple specified pipelines 408 wherein the messages described herein are sent to the elements of the individual pipeline 408 rather than the elements of all pipelines in hub 402.

Figure 6:
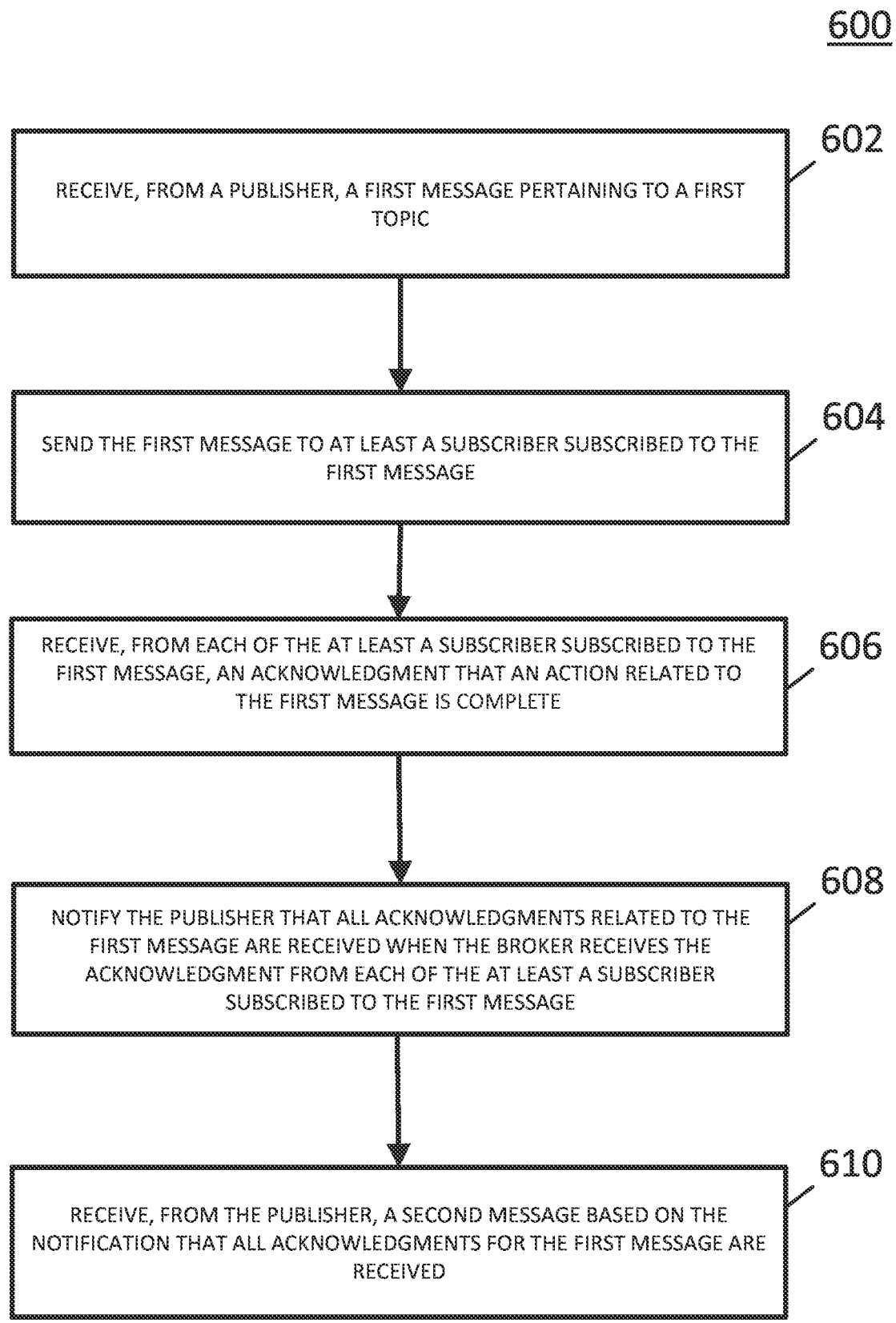
FIG. 6 is a block diagram of an example process for coordinating publish-subscribe messaging according to an embodiment of the presently disclosed subject matter.

FIG. 6 is a block diagram of example process 600 for coordinating publish-subscribe messaging. In some embodiments, process 600, or portions thereof, may be performed by or at broker 104. In step 602, the broker receives, from a publisher, a first message pertaining to a first topic. The first message may include a message to stop sourcing data.

In step 604, the broker sends the first message to at least a subscriber subscribed to the first message. The subscriber may include at least a data source in a pipeline. The at least a data source may be configured to provide data from a mainframe computer. A first data source of the at least a data source may be in a first pipeline and a second data source of the at least a data source may be in a second pipeline.

In step 606, the broker receives, from each of the at least a subscriber subscribed to the first message, an acknowledgment that an action related to the first message is complete. The action related to the first message may include stop collecting data and finish providing data already collected.

In step 608, the broker notifies the publisher that all acknowledgments related to the first message are received when the broker receives the acknowledgment from each of the at least a subscriber subscribed to the first message.

In step 610, the broker receives, from the publisher, a second message based on the notification that all acknowledgments for the first message are received. The second message includes a message to finish processing data.

In some embodiments, the process 600 may further include sending, by the broker, the second message to at least a process module in the pipeline, the at least a process module being subscribed to the second message, the at least a process module being configured for receiving and processing data from the at least a data source; receiving, by the broker from each of the at least a process module, an acknowledgment that the at least a process module finished processing data received from the at least a data source; and notifying, by the broker, the publisher that all acknowledgments related to the second message are received when the broker receives the acknowledgment from each of the at least a process module. The at least a process module may be configured to apply a simple filter to data.

The process 600 may further include receiving, by the broker from the publisher, a third message based on the notification that all acknowledgments for the second message are received, the third message including a message to finish sending data; sending, by the broker, the third message to at least a data target in the pipeline, the at least a data target being subscribed to the third message, the at least a data target configured for receiving and sending processed data from the at least a process module; receiving, by the broker from each of the at least a data target, an acknowledgment that the at least a data target finished sending processed data from the at least a process module; and notifying, by the broker, the publisher that all acknowledgments related to the third message are received when the broker receives the acknowledgment from each of the at least a data target. The at least a data target may be configured to send the processed data to a plurality of outputs.

The process 600 may further include receiving, by the broker from the publisher, a fourth message based on the notification that all acknowledgments for the third message are received, the fourth message including a message to reclaim resources; sending, by the broker, the fourth message to at least a shared resource manager, the at least a shared resource manager being subscribed to the fourth message; receiving, by the broker from each of the at least a shared resource manager, an acknowledgment that the at least a shared resource manager finished closing all open connections in the pipeline; notifying, by the broker, the publisher that all acknowledgments related to the fourth message are received when the broker receives the acknowledgment from each of the at least a shared resource manager.

It will be appreciated that process 600 is for illustrative purposes and that different and/or additional actions may be used. It will also be appreciated that various actions described herein may occur in a different order or sequence.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for coordinating publish-subscribe messaging, the method comprising:

receiving, by a broker from a publisher, a first message pertaining to a first topic, wherein the first message includes a message to stop sourcing data;

sending, by the broker, the first message to at least a subscriber subscribed to the first message, wherein the at least a subscriber subscribed to the first message includes at least a data source in a pipelines;

receiving, by the broker from each of the at least a subscriber subscribed to the first message, an acknowledgment that an action related to the first message is complete, wherein the action related to the first message includes stop collecting data and finish providing data already collected;

notifying, by the broker, the publisher that all acknowledgments related to the first message are received when the broker receives the acknowledgment from each of the at least a subscriber subscribed to the first message; and receiving, by the broker from the publisher, a second message based on the notification that all acknowledgments for the first message are received, wherein the second message includes a message to finish processing data.

2. The method of claim 1, comprising:
sending, by the broker, the second message to at least a process module in the pipeline, the at least a process module being subscribed to the second message, the at least a process module being configured for receiving and processing data from the at least a data source;
receiving, by the broker from each of the at least a process module, an acknowledgment that the at least a process module finished processing data received from the at least a data source; and
notifying, by the broker, the publisher that all acknowledgments related to the second message are received when the broker receives the acknowledgment from each of the at least a process module.

3. The method of claim 2, wherein the at least a process module is configured to apply a simple filter to data.

4. The method of claim 2 further comprising:
receiving, by the broker from the publisher, a third message based on the notification that all acknowledgments for the second message are received, the third message including a message to finish sending data;
sending, by the broker, the third message to at least a data target in the pipeline, the at least a data target being subscribed to the third message, the at least a data target configured for receiving and sending processed data from the at least a process module;
receiving, by the broker from each of the at least a data target, an acknowledgment that the at least a data target finished sending processed data from the at least a process module; and
notifying, by the broker, the publisher that all acknowledgments related to the third message are received when the broker receives the acknowledgment from each of the at least a data target.

5. The method of claim 4, wherein the at least a data target is configured to send the processed data to a plurality of outputs.

6. The method of claim 4 further comprising:
receiving, by the broker from the publisher, a fourth message based on the notification that all acknowledgments for the third message are received, the fourth message including a message to reclaim resources;
sending, by the broker, the fourth message to at least a shared resource manager, the at least a shared resource manager being subscribed to the fourth message;
receiving, by the broker from each of the at least a shared resource manager, an acknowledgment that the at least a shared resource manager closed all open connections in the pipeline; and
notifying, by the broker, the publisher that all acknowledgments related to the fourth message are received when the broker receives the acknowledgment from each of the at least a shared resource manager.

7. The method of claim 1, wherein the at least a data source is configured to provide data from a mainframe computer.

8. The method of claim 1, wherein a first data source of the at least a data source is in a first pipeline and a second data source of the at least a data source is in a second pipeline.

9. A system for coordinating publish-subscribe messaging, the system comprising:

a processor;
a memory communicatively connected to the processor; and
broker implemented using the processor and the memory, wherein the broker is configured for:
receiving, from a publisher, a first message pertaining to a first topic, wherein the first message includes a message to stop sourcing data;
sending the first message to at least a subscriber subscribed to the first message, wherein the at least a subscriber subscribed to the first message includes at least a data source in a pipeline;
receiving, from each of the at least a subscriber subscribed to the first message, an acknowledgment that an action related to the first message is completed, wherein the action related to the first message includes stop collecting data and finish providing data already collected;
notifying the publisher that all acknowledgments related to the first message are received when the broker receives the acknowledgment from each of the at least a subscriber subscribed to the first message; and
receiving, from the publisher, a second message based on the notification that all acknowledgments for the first message are received, wherein the second message includes a message to finish processing data.

10. The system of claim 9 wherein the broker is further configured for:
sending the second message to at least a process module in the pipeline, the at least a process module being subscribed to the second message, the at least a process module being configured for receiving and processing data from the at least a data source;
receiving, from each of the at least a process module, an acknowledgment that the at least a process module finished processing data received from the at least a data source; and
notifying the publisher that all acknowledgments related to the second message are received when the broker receives the acknowledgment from each of the at least a process module.

11. The system of claim 10, wherein the at least a process module is configured to apply a simple filter to data.

12. The system of claim 10 wherein the broker is further configured for:
receiving, from the publisher, a third message based on the notification that all acknowledgments for the second message are received, the third message including a message to finish sending data;
sending the third message to at least a data target in the pipeline, the at least a data target being subscribed to the third message, the at least a data target configured for receiving and sending processed data from the at least a process module;
receiving, from each of the at least a data target, an acknowledgment that the at least a data target finished sending processed data from the at least a process module; and
notifying the publisher that all acknowledgments related to the third message are received when the broker receives the acknowledgment from each of the at least a data target.

13. The system of claim 12, wherein the at least a data target is configured to send the processed data to a plurality of outputs.

14. The system of claim 12 wherein the broker is further configured for:
- receiving, from the publisher, a fourth message based on the notification that all acknowledgments for the third message are received, the fourth message including a message to reclaim resources;
- sending the fourth message to at least a shared resource manager, the at least a shared resource manager being subscribed to the fourth message;
- receiving, from each of the at least a shared resource manager, an acknowledgment that the at least a shared resource manager closed all open connections in the pipeline; and
- notifying the publisher that all acknowledgments related to the fourth message are received when the broker receives the acknowledgment from each of the at least a shared resource manager.

15. The system of claim 9, wherein the at least a data source is configured to provide data from a mainframe computer.

16. The system of claim 9, wherein a first data source of the at least a data source is in a first pipeline and a second data source of the at least a data source is in a second pipeline.

17. A non-transitory computer readable medium having stored thereon executable instructions that when executed by at least one processor of at least one computer cause the at least one computer to perform steps comprising:
- receiving, from a publisher, a first message pertaining to a first topic, wherein the first message includes a message to stop sourcing data;
- sending the first message to at least a subscriber subscribed to the first message, wherein the at least a subscriber subscribed to the first message includes at least a data source in a pipelines;
- receiving, from each of the at least a subscriber subscribed to the first message, an acknowledgment that the at least a subscriber subscribed to the first message completed an action related to the first message, wherein the action related to the first message includes stop collecting data and finish providing data already collected;
- notifying the publisher that all acknowledgments related to the first message are received based on receiving the acknowledgment from each of the at least a subscriber subscribed to the first message; and
- receiving, from the publisher, a second message based on the notification that all acknowledgments for the first message are received, wherein the second message includes a message to finish processing data.

* * * * *